United States Patent
He

(10) Patent No.: US 11,470,167 B2
(45) Date of Patent: Oct. 11, 2022

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventor: Shouwei He, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 216 days.

(21) Appl. No.: 16/926,116

(22) Filed: Jul. 10, 2020

(65) Prior Publication Data

US 2021/0021690 A1    Jan. 21, 2021

(30) Foreign Application Priority Data

Jul. 15, 2019  (CN) .......................... 201910635973.5

(51) Int. Cl.
| | | |
|---|---|---|
| *H04L 67/306* | (2022.01) | |
| *G06F 17/16* | (2006.01) | |
| *G06F 17/18* | (2006.01) | |
| *H04L 9/40* | (2022.01) | |

(52) U.S. Cl.
CPC ............ *H04L 67/306* (2013.01); *G06F 17/16* (2013.01); *G06F 17/18* (2013.01); *H04L 63/1483* (2013.01)

(58) Field of Classification Search
CPC ......... G06F 21/41; G06F 21/30; H04L 63/08; H04L 43/062; G06N 3/08; G06N 3/0445
See application file for complete search history.

(56) References Cited

U.S. PATENT DOCUMENTS

| | | | | |
|---|---|---|---|---|
| 10,104,159 | B2* | 10/2018 | Ishihara | G06Q 10/101 |
| 10,650,150 | B1* | 5/2020 | Rajasooriya | G06F 21/577 |
| 10,754,959 | B1* | 8/2020 | Rajasooriya | H04L 63/1433 |
| 10,848,515 | B1* | 11/2020 | Pokhrel | H04L 63/1416 |
| 2013/0074167 | A1* | 3/2013 | Bailey | G06F 21/41 726/8 |
| 2013/0151617 | A1* | 6/2013 | Davis | H04L 63/08 709/204 |
| 2015/0356703 | A1* | 12/2015 | Ellis | G06Q 50/30 705/7.17 |
| 2019/0139431 | A1* | 5/2019 | Gordon | G09B 5/00 |
| 2020/0036611 | A1* | 1/2020 | Lu | H04L 43/16 |

* cited by examiner

*Primary Examiner* — Mahran Y Abu Roumi
(74) *Attorney, Agent, or Firm* — Seed IP Law Group LLP

(57) ABSTRACT

A method and an apparatus for generating information are provided. The method may include determining identity-related information corresponding to at least one account identification according to historical upload information; determining an account relationship matrix between the at least one account identification based on the identity-related information corresponding to the at least one account identification; obtaining a probability transfer matrix according to the account relationship matrix; calculating importance degree information of the at least one account identification based on the probability transition matrix and a predetermined initial importance degree vector. This embodiment determines the importance degree of each of the plurality of account identities based on the identity-related information.

7 Claims, 5 Drawing Sheets

METHOD AND APPARATUS FOR GENERATING INFORMATION

CROSS-REFERENCE TO RELATED APPLICATIONS

This application claims priority to Chinese Patent Application No. 201910635973.5, filed on Jul. 15, 2019, titled "Method and Apparatus for Generating Information," which is hereby incorporated by reference in its entirety.

TECHNICAL FIELD

Embodiments of the present disclosure relate to the field of computer technology, and more particularly, to a method and apparatus for generating information.

BACKGROUND

At present, the user may upload POI (point of interest) information. However, this manner of obtaining the POI information always faces a severe problem of user cheating. Current anti-cheating systems generally use working experience of experts to develop rules-based cheating strategies and determine thresholds. Then, historical upload data of the account is collected and analyzed, and if the historical upload data of the account triggers a threshold value of a certain type of preset cheating strategy, the account is in a blacklist or uploaded information is restricted. However, the underground gangs are often group-oriented, and multiple persons cooperate and have clear job division. If one account is found to be restricted by the cheating strategy, the account will be switched to another new account for information uploading based on the interest demand. Therefore, the anti-cheating strategy for single-user and single-account is not effective, the determination of the cheating account needs the relationship between multiple accounts.

SUMMARY

Embodiments of the present disclosure provide a method and apparatus for generating information.

According to a first aspect, an embodiment of the present disclosure provides a method for generating information, the method including: determining identity-related information corresponding to at least one account identification according to historical upload information; determining an account relationship matrix between the at least one account identification based on the identity-related information corresponding to the at least one account identification; obtaining a probability transfer matrix according to the account relationship matrix; and calculating importance degree information of the at least one account identification based on the probability transition matrix and a predetermined initial importance degree vector.

In some embodiments, the method further includes receiving a group cheating prediction request, where the group cheating prediction request includes a group cheating proportion; sorting the account identifications in the at least one account identification in a descending order of importance degree according to the importance degree information; and selecting a highest-ranked group cheating proportion of the account identifications in a sorting result as a group cheating account identification for transmission.

In some embodiments, the calculating the importance degree information of the at least one account identification based on the probability transition matrix and a predeter-mined initial importance degree vector includes: performing, using the initial importance degree vector as a previous importance degree vector, following information determining steps: multiplying the probability transition matrix by the previous importance degree vector; determining a current importance degree vector based on the multiplication result; determining whether a difference between the current importance degree vector and the previous importance degree vector is greater than a preset difference threshold; in response to determining that the difference between the current importance degree vector and the previous importance degree vector is not greater than the preset difference threshold, using the current importance degree vector as the importance degree information.

In some embodiments, the information determining step further includes continuing to perform the information determining step by using the current importance degree vector as the previous importance degree vector, in response to determining that the difference between the current importance degree vector and the previous importance degree vector is greater than the preset difference.

In some embodiments, the identity-related information corresponding to the account identification in the at least one account identification includes at least one identity feature; and the determining an account relationship matrix between the at least one account identification according to the identity-related information corresponding to the at least one account identification includes setting a weight for an identity feature in the at least one identity feature based on predetermined relationship weight information; determining the account relationship matrix between the at least one account identification based on the weight of the identity feature in the at least one identity feature and the identity-related information corresponding to the at least one account identification.

According to a second aspect, an embodiment of the present disclosure provides an apparatus for generating information, the apparatus including: a first determining unit configured to determine identity-related information corresponding to at least one account identification based on historical upload information; a second determining unit configured to determine an account relationship matrix between the at least one account identification according to the identity-related information corresponding to the at least one account identification; a matrix generating unit configured to obtain a probability transfer matrix according to the account relationship matrix; an information generating unit configured to calculate the importance degree information of the at least one account identification based on the probability transition matrix and a predetermined initial importance degree vector.

In some embodiments, the apparatus further includes a receiving unit configured to receive a group cheating prediction request, where the group cheating prediction request includes a group cheating proportion; a sorting unit configured to sort the account identifications in the at least one account identification in a descending order of importance degree according to the importance degree information; and a transmitting unit configured to select a highest-ranked group cheating proportion of the account identifications in a sorting result as the group cheating account identification for transmission.

In some embodiments, the information generating unit is further configured to perform, using the initial importance degree vector as the previous importance degree vector, following information determining steps: multiplying the probability transition matrix by the previous importance degree vector; determining a current importance degree vector based on the multiplication result; determining whether a difference between the current importance degree vector and the previous importance degree vector is greater than a preset difference threshold; in response to determining that the difference between the current importance degree vector and the previous importance degree vector is not greater than the preset difference threshold, using the current importance degree vector as the importance degree information.

In some embodiments, the information determining step further includes continuing to perform the information determining step by using the current importance degree vector as the previous importance degree vector in response to determining that the difference between the current importance degree vector and the previous importance degree vector is greater than the preset difference threshold.

In some embodiments, the identity-related information corresponding to the account identification in the at least one account identification includes at least one identity feature; and the second determining unit is further configured to set a weight for the identity feature in the at least one identity feature based on the predetermined relationship weight information; determining the account relationship matrix between the at least one account identification based on the weight of the identity feature in the at least one identity feature and the identity-related information corresponding to the at least one account identification.

In a third aspect, an embodiment of the present disclosure provides a server including one or more processors; an storage apparatus storing one or more programs, where the one or programs when executed by the one or more processors cause the one or more processors to implement the method as described in any one of the embodiments of the first aspect.

In a fourth aspect, an embodiment of the present disclosure provides a computer readable medium storing a computer program, where the computer program, when executed by a processor, implements the method as described in any one of the embodiments of the first aspect.

According to the method and apparatus for generating information provided in embodiments of the present disclosure, identity-related information corresponding to at least one account identification is first determined according to historical uploading information, then an account relationship matrix between the at least one account identification is determined according to the identity-related information corresponding to the at least one account identification, then a probability transfer matrix is obtained according to the account relationship matrix, and finally importance degree information of the at least one account identification is calculated according to the probability transfer matrix and an initial importance degree vector, so that the importance degree of each account identification in a plurality of account identifications is determined based on the identity-related information.

BRIEF DESCRIPTION OF THE DRAWINGS

Other features, objects, and advantages of the present disclosure will become more apparent by reading the detailed description of non-limiting embodiments made with reference to the following drawings.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that embodiments in the present disclosure and the features in the embodiments may be combined with each other on a non-conflict basis. The present disclosure will be described below in detail with reference to the accompanying drawings and in combination with the embodiments.

Figure 1:
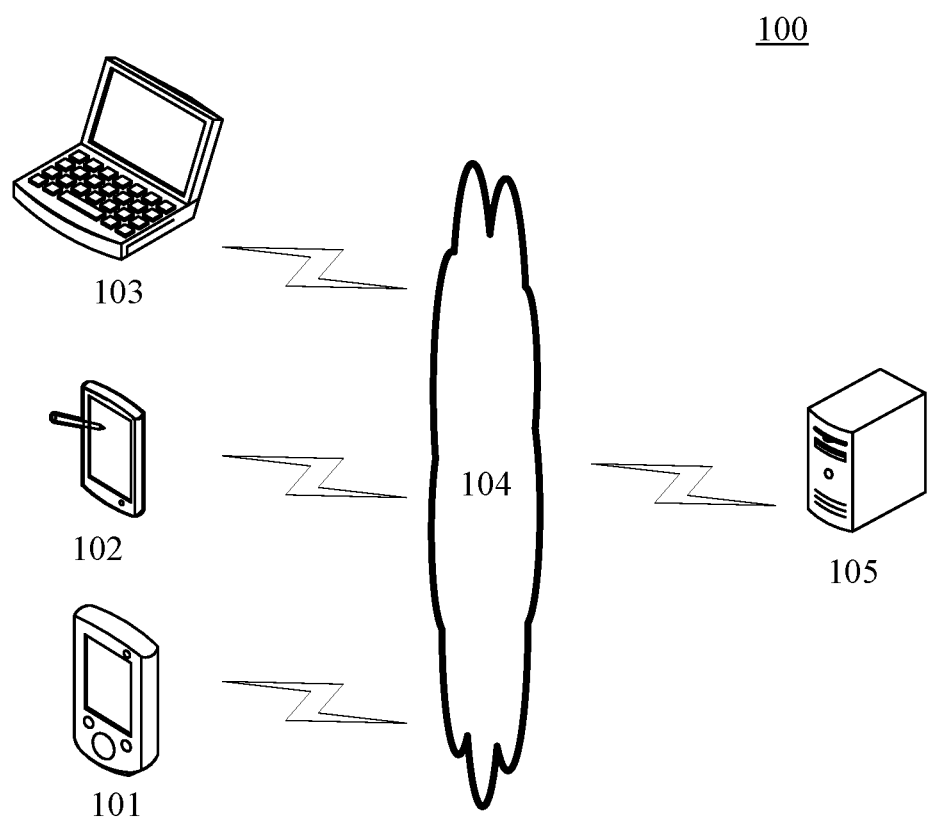
FIG. 1 is an example system architecture diagram in which embodiments of the present disclosure may be applied.

FIG. 1 illustrates an example system architecture 100 in which a method for generating information or an apparatus for generating information of an embodiment of the present disclosure may be applied.

As shown in FIG. 1, the system architecture 100 may include terminal devices 101, 102, 103, a network 104, and a server 105. The network 104 serves as a medium for providing a communication link between the terminal devices 101, 102, 103 and the server 105. Network 104 may include various types of connections, such as wired or wireless communication links, or optical fiber cables.

The user 110 may use the terminal devices 101, 102 and 103 to interact with the server 105 through the network 104, in order to transmit or receive messages, etc. Various communication client applications, such as a map application, a web browser application, a shopping application, a search application, an instant messaging tool, a mailbox client, social platform software, may be installed on the terminal devices 101, 102 and 103.

The terminal devices 101, 102, 103 may be hardware or software. When the terminal devices 101, 102, 103 are hardware, they may be various electronic devices having a display screen and supporting information uploading, including but not limited to a smartphone, a tablet computer, a laptop computer, a desktop computer, and the like. When the terminal devices 101, 102, and 103 are software, they may be installed in the electronic devices listed above. The terminal devices 101, 102, and 103 may be implemented as a plurality of software pieces or software modules (e.g., for providing distributed services) or as a single software or software module, which is not specifically limited herein.

The server 105 may be a server that provides various services, for example, a background server that analyzes historical upload information uploaded by the terminal devices 101, 102, 103. The background server may perform processing such as analyzing historical uploading information and generate importance degree information.

It should be noted that the server 105 may be hardware or software. When the server 105 is hardware, it may be implemented as a distributed server cluster composed of multiple servers, or it may be implemented as a single server. When the server 105 is software, it may be implemented as a plurality of software pieces or software modules (e.g., for providing distributed services), or it may be implemented as a single software or software module, which is not specifically limited herein.

It should be appreciated that the numbers of the terminal devices, the networks and the servers in FIG. 1 are merely illustrative. Any number of terminal devices, networks and servers may be provided based on the actual requirements.

It should be noted that the method for generating information provided in embodiments of the present disclosure is generally performed by the server 105, and accordingly, the apparatus for generating information is generally arranged in the server 105.

Figure 2:
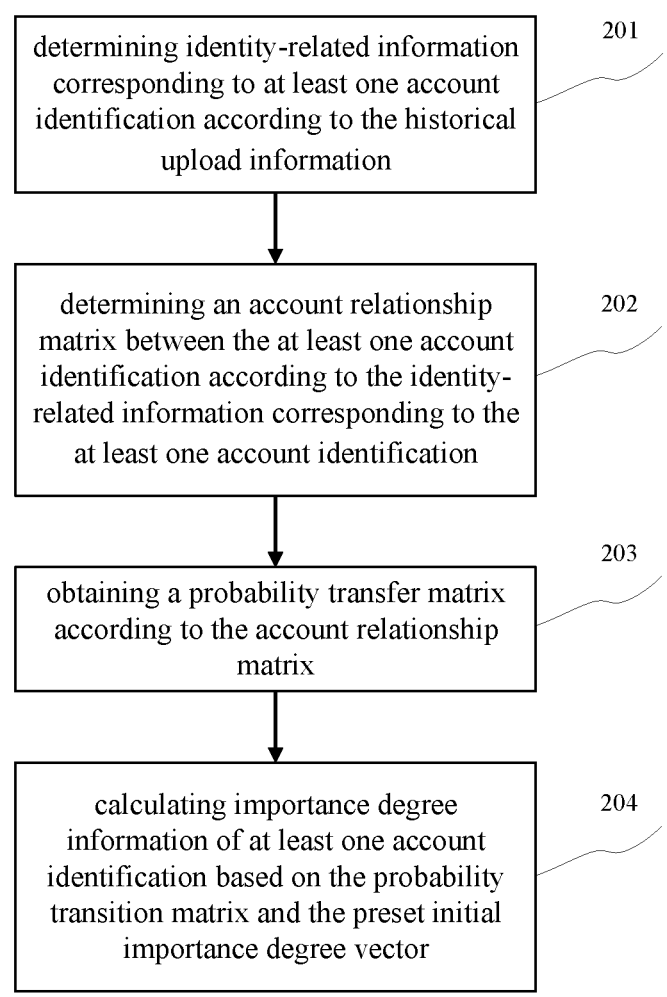
FIG. 2 is a flowchart of an embodiment of a method for generating information according to the present disclosure.

With continuing reference to FIG. 2, a flow 200 of an embodiment of a method for generating information in accordance with the present disclosure is shown. The method for generating information includes steps 201 to 202.

Step 201 includes: determining identity-related information corresponding to at least one account identification according to the historical upload information.

In the present embodiment, an execution body of a method for generating information (for example, the server 105 shown in FIG. 1) may receive upload information of a terminal device (for example, the terminal devices 101, 102, 103 shown in FIG. 1). By way of example, a piece of upload information may include POI information, an account identification, an IP address (Internet Protocol Address), a location coordinate, a device number, a device model, contact information (e.g., contact address, contact phone, etc.), an application version number, and the like. The account identification may be used to uniquely identify an account, for example, the account identification may be a user name. The IP address may be the IP address of the terminal device when the information is uploaded. The location coordinates may be coordinates of the geographic location where the terminal device is located when uploading the upload information. The device number may refer to the device number of the terminal device uploading the upload information, and the device number may be used to uniquely identify a terminal device. The device model may refer to the device model of the terminal device that uploads the upload information. The contact information may refer to contact information filled in by a user on a preset upload page when uploading the upload information, and may include a contact address, a telephone number, and the like.

The execution body may take all received upload information or upload information received within a preset period (e.g., within the last year) as historical upload information. The historical information is analyzed to obtain the identity-related information corresponding to the at least one account identification. Here, the identity-related information corresponding to an account identification may refer to information related to the identity of the user who registers the account identification. Generally, the IP address, the location coordinate, the device number, the contact information, and the like may be related to the identity of the user. Therefore, the IP address, the location coordinate, the device number, the contact information, and the like may be used as the identity-related information corresponding to the account identification. In practice, which information in the upload information can be used as the identity-related information corresponding to the account identification can be preset according to actual requirements. In this way, the execution body can extract the account identification and the identity-related information corresponding to the account identification from the historical information.

Step 202 includes: determining an account relationship matrix between the at least one account identification according to the identity-related information corresponding to the at least one account identification.

In the present embodiment, the execution body may determine the account relationship matrix between the at least one account identification based on the identity-related information corresponding to the at least one account identification obtained in step 201. As an example, the execution body may set a node for storing the account identification for each of the at least one account identification described above. Then, the execution body may determine the relationship between the two nodes according to the identity-related information corresponding to each account identification, thereby obtaining a relationship network corresponding to at least one node, and determine the account relationship matrix according to the relationship network. The number of rows and columns of the account relationship matrix is equal to the number of account identifications in the at least one account identification.

Figure 3:
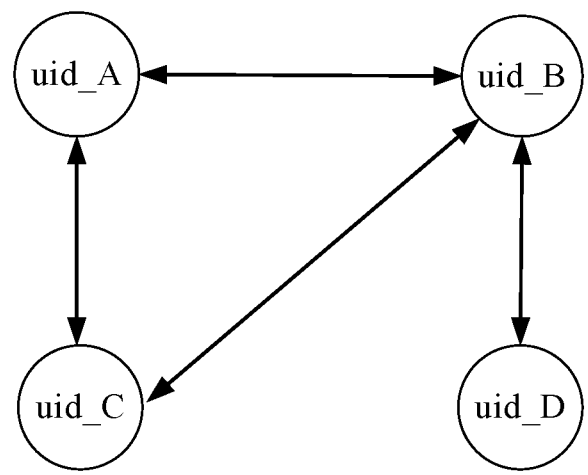
FIG. 3 is a relational network obtained by taking a case that identity-related information corresponding to an account identification includes a device number and an IP address as an example.

Referring to FIG. 3, in FIG. 3, the case that identity-related information corresponding to the account identification includes a device number and an IP address is taken as an example, assuming that the account identification includes uid_A, uid_B, uid_C, and uid_D.

The identity-related information of the uid_A includes device number cuid_A and IP_A;

The identity-related information of the uid_B includes device number cuid_B and IP_A;

The identity-related information of the uid_C includes device number cuid_C and IP_A;

The identity-related information of the uid_D includes device number cuid_B and IP_D.

First, the execution body may establish a relational network of nodes uid_A, uid_B, uid_C, and uid_D. Specifically, since uid_A, uid_B, and uid_C all include IP_A, a side relationship may be established between each two of uid_A, uid_B, and uid_C through IP_A. Since both the uid_B and the uid_D include cuid_B, the side relationship between the uid_B and the uid_D can be established through the cuid_B to obtain a relationship network as shown in FIG. 3. Thereafter, the execution body may determine a node relationship matrix between the nodes uid_A, uid_B, uid_C, and uid_D, that is, an account relationship matrix, based on the relationship network, where $$W = \begin{bmatrix} 0 & 1 & 1 & 0 \\ 1 & 0 & 1 & 1 \\ 1 & 1 & 0 & 0 \\ 0 & 1 & 0 & 0 \end{bmatrix};$$

where each element in the account relationship matrix is $$W_{ij} = \begin{cases} 0 \\ 1 \end{cases},$$

$W_{ij}=0$ indicates that there is no relationship between node i and node j, and $W_{ij}=1$ indicates that there is a relationship between node i and node j. $W_{ij}$ represents an element in row i and column j of the matrix, $1 \leq i \leq N$, $1 \leq j \leq N$ and N indicating the number of nodes. In this example, there are four nodes, namely, uid_A, uid_B, uid_C, and uid_D.

In some alternative implementations of the present embodiment, the identity-related information corresponding to the account identification in the at least one account identification may include at least one identity feature.

As an example, the identity feature may be feature information related to the identity of the user registering the account identification. Here, each kind of the identity-related information may be regarded as the identity feature. For example, the identity feature may include an IP address, a location coordinate, a device number, contact information, and the like. Step 202 may be performed as follows.

First, a weight is set for an identity feature in at least one identity feature based on predetermined relationship weight information.

In the present implementation, the execution body may set a weight for each of the at least one identity feature based on the predetermined relationship weight information. Here, the relationship weight information may be used to represent the weight of each feature in determining the account identification relationship. In practice, the relationship weight information may be set according to actual requirements. For example, the relationship weight information may be obtained by a technician based on multiple trials and evaluations. As an example, it may be set that a larger weight indicates that the feature is more important in determining the account identification relationship. In practice, if the device numbers carried in the uploading information of the two account identifications are the same, it indicates that there is a strong relationship between the two account identifications. Therefore, the weight corresponding to the device number may be set to be larger, for example, 10. If the IP addresses carried when the two account identifications upload information are the same, that is, the two account identifications access the Internet through the same gateway, it indicates that there is a weak relationship between the two account identifications, and the weights corresponding to the IP addresses may be set to be small, for example, 1.

Then, the account relationship matrix between the at least one account identification is determined based on the weight of the identity feature in the at least one identity feature and the identity-related information corresponding to the at least one account identification.

In the present implementation, the execution body may determine the account relationship matrix between the at least one account identification based on the weight of the identity feature in the at least one identity feature and the identity-related information corresponding to the at least one account identification.

For example, in the relational network shown in FIG. 3, the weight of the device number is 10, and the weight of the IP address is 1. Since uid_A, uid_B, and uid_C all include IP_A, a side having a weight of 1 can be established between each two of uid_A, uid_B, and uid_C. Since both uid_B and uid_D include cuid_B, a side with a weight of 10 can be established between uid_B and uid_D. Thus the following account relationship matrix is obtained:

$$\begin{bmatrix} 0 & 1 & 1 & 0 \\ 1 & 0 & 1 & 10 \\ 1 & 1 & 0 & 0 \\ 0 & 10 & 0 & 0 \end{bmatrix}.$$

Step 203 includes: obtaining a probability transfer matrix according to the account relationship matrix.

In the present embodiment, the execution body may obtain the probability transfer matrix according to the account relationship matrix obtained in step 202. Specifically, the execution body may first normalize the account relationship matrix to obtain a normalized relationship matrix, wherein $H^T$ $$H_{ij}^T = W_{ij} \bigg/ \sum_{i=0}^{N} W_{ij},$$

where, N denotes the number of nodes, $H_{ij}^T$ denotes $i^{th}$ row and $j^{th}$ column in the normalized relationship matrix, where $1 \leq i \leq N$ and $1 \leq j \leq N$.

Thereafter, the execution body may use the transposed matrix H of the normalized relationship matrix $H^T$ as the probability transition matrix. In practice, the account relationship matrix may be used to represent relationships between account identities. Assuming $W_{ij}=1$, that is there is a relationship between node i and node j, and this relationship may be understood as a voting behavior, that is, the node i votes for the node j, how many nodes do the node i vote for when node i vote for node j needs to be considered, because it is assumed that the total number of votes of node i is 1, so that the more nodes node i needs to vote, the less votes each node obtains. For example, node i votes for three nodes, and each node obtains one third of the votes. The transposed matrix H of the normalized relationship matrix $H^T$ represents the transfer of the number of votes after the nodes vote for each other.

Step 204 includes: calculating importance degree information of at least one account identification based on the probability transition matrix and the preset initial importance degree vector.

In this embodiment, the execution body may set the initial importance degree vector in advance. The initial importance degree vector may be a column vector, and the number of columns of the initial importance degree vector is the same as the number of rows of the probability transition matrix. As an example, the values of all columns of the initial importance degree vector may be 1/N, where N denotes the number of nodes. Thereafter, the execution body may calculate the importance degree information of the at least one account identification according to the probability transition matrix and the initial importance degree vector, where the importance degree information may be a column vector containing the same number of elements as the number of account identifications included in the at least one account identification, and the elements are used to indicate the importance degrees of the account identifications. As an example, the execution body may use the multiplication of the probability transition matrix and the multiplication of the initial importance degree vector to obtain a column vector, and use the obtained column vector as the importance degree information of the at least one account identification, and the elements of the column vector corresponds to account identifications in the at least one account identification respectively and used for indicating the importance degrees of the account identifications.

In some alternative implementations of the present embodiment, the above-described step 204 may be specifically performed as follows.

With the initial importance degree vector as the previous importance degree vector, the following information determination step S1~S4 is performed.

Step S1 includes multiplying the probability transition matrix by the previous importance degree vector.

In the present implementation, the execution body may multiply the probability transition matrix by the previous importance degree vector. Here, the previous importance degree vector is a column vector.

Step S2 includes: determining a current importance degree vector according to the multiplication result;

In the present implementation, the multiplication result of the multiplication of the probability transition matrix and the previous importance degree vector is a column vector. As an example, the execution body may process (e.g., weight) the column vector obtained by multiplication to obtain the current importance degree vector. For example, the execution body may calculate the current importance degree vector by the following formula:

$$p_{n+1}=\alpha*H*p_n+(1-\alpha)e^T/N;$$

where, $p_{n+1}$ represents the current importance degree vector, H represents the probability transition matrix, $p_n$ represents the previous importance degree vector, $e^T$ represents the unit row vector, $\alpha$ represents the hyperparameter, and the value of $\alpha$ may be set according to actual requirements, for example, 0.85. N Indicates the number of nodes.

Step S3 includes determining whether a difference between the current importance degree vector and the previous importance degree vector is greater than a preset error threshold.

In the present implementation, the execution body may first calculate the difference between the current importance degree vector and the previous importance degree vector by:

$$E=|p_{n+1}-p_n|$$

where, E represents the difference between the current importance degree vector and the previous importance degree vector.

Thereafter, the execution body may compare the difference between the current importance degree vector and the previous importance degree vector with a preset difference threshold, and determine whether the difference between the current importance degree vector and the previous importance degree vector is greater than the error threshold.

Step S4 includes: in response to determining that the difference between the current importance degree vector and the previous importance degree vector is not greater than the preset difference threshold, using the current importance degree vector as the importance degree information.

In the present implementation, if the difference between the current importance degree vector and the previous importance degree vector is not greater than (smaller than or equal to) the preset difference threshold, the current importance degree vector is used as the importance degree information.

In some alternative implementations, the information determining step may further include:

step S5 including: in response to determining that the difference between the current importance degree vector and the previous importance degree vector is greater than a preset difference threshold, continuing the information determining step by using the current importance degree vector as the previous importance degree vector.

In the implementation, if the difference between the current importance degree vector and the previous importance degree vector is greater than the preset difference threshold, the execution body may continue to execute the above information determination step by using the current importance degree vector as the previous importance degree vector.

Figure 4:
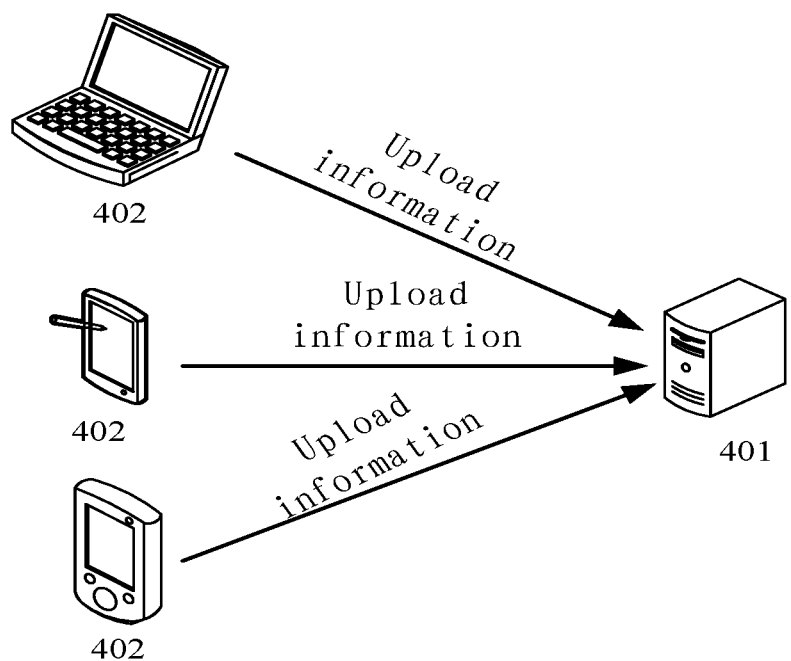
FIG. 4 is a schematic diagram of an application scenario of a method for generating information according to the present disclosure.

With continued reference to FIG. 4, FIG. 4 is a schematic diagram of an application scenario of a method for generating information according to the present embodiment. In the application scenario of FIG. 4, the server 401 may determine the identity-related information corresponding to the plurality of account identifications according to the historical upload information uploaded by the terminal device 402. Then, the server 401 determines an account relationship matrix between the plurality of account identities based on the identity-related information corresponding to the plurality of account identities. Then, the server 401 obtains the probability transfer matrix according to the account relationship matrix between the plurality of account identifications. Finally, the server 401 calculates the importance degree information of the plurality of account identifications based on the probability transition matrix and the preset initial importance degree vector.

The method provided in the above embodiment of the present disclosure determines an account relationship matrix between a plurality of account identities by using the identity-related information corresponding to the account identities in historical upload information, and generates importance degree information of the plurality of account identities based on the account relationship matrix, thereby determining the importance degree of each of the plurality of account identities.

Figure 5:
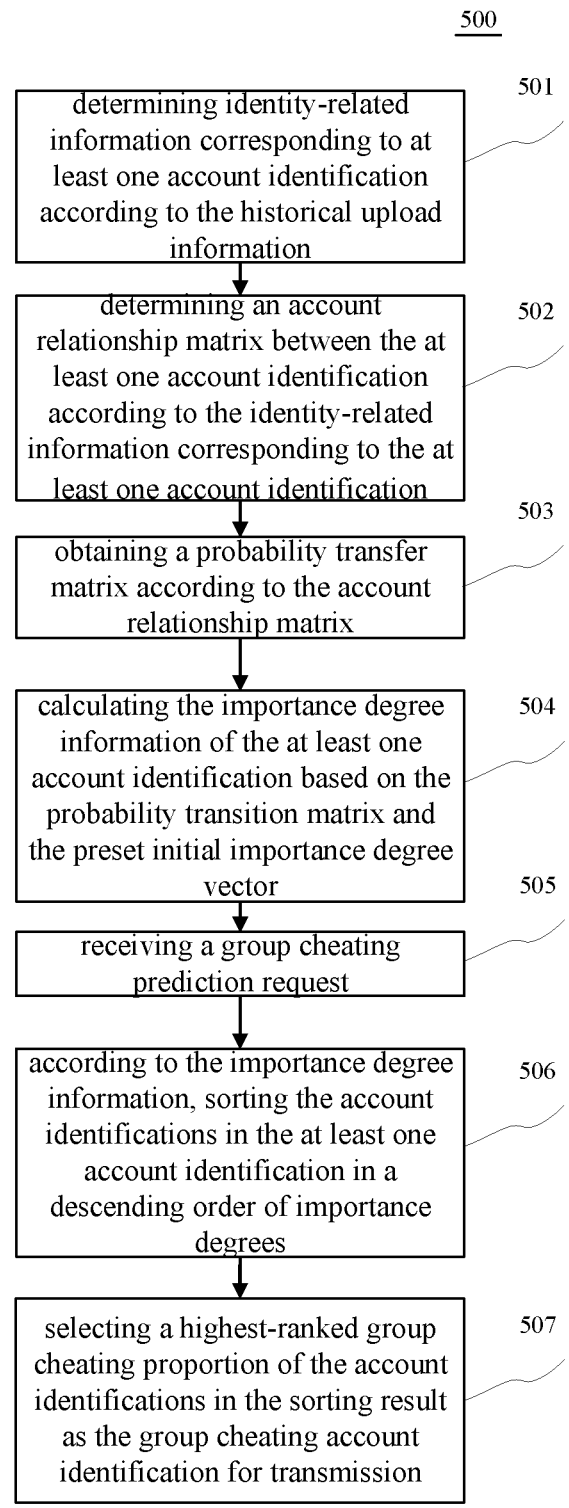
FIG. 5 is a flowchart of another embodiment of a method for generating information according to the present disclosure.

Referring further to FIG. 5, a flow 500 of another embodiment of a method for generating information is illustrated. The flow 500 of the method for generating information includes steps 501 to 507.

Step 501 includes: determining identity-related information corresponding to at least one account identification according to the historical upload information.

In this embodiment, step 501 is similar to step 201 of the embodiment shown in FIG. 2, and details are not described herein.

Step 502 includes: determining an account relationship matrix between the at least one account identification according to the identity-related information corresponding to the at least one account identification.

In this embodiment, step 502 is similar to step 202 of the embodiment shown in FIG. 2, and details are not described herein.

Step 503 includes: obtaining a probability transfer matrix according to the account relationship matrix.

In this embodiment, step 503 is similar to step 203 of the embodiment shown in FIG. 2, and details are not described herein.

Step 504 includes calculating the importance degree information of the at least one account identification based on the probability transition matrix and the preset initial importance degree vector.

In this embodiment, step 504 is similar to step 204 of the embodiment shown in FIG. 2, and details are not described herein.

Step 505 includes: receiving a group cheating prediction request.

In this embodiment, the execution body may receive the group cheating prediction request sent by the terminal device. The group cheating prediction request may include a group cheating proportion. As an example, the group cheating proportion may be a proportion that a technician manually predicts based on historical upload information. This proportion may indicate a proportion of account identifications uploading the history upload information that are the group cheating account identifications.

Step 506 includes according to the importance degree information, sorting the account identifications in the at least one account identification in a descending order of importance degrees.

In the present embodiment, the execution body may sort each of the at least one account identification in the descending order of importance degrees according to the importance degree information. Here, the importance degree information is a column vector, elements of the column vector corresponds to account identifications in the at least one account identification respectively, and the value of the column vector element may be the importance degree of the corresponding account identification.

Step 507 includes selecting a highest-ranked group cheating proportion of the account identifications in the sorting result as the group cheating account identification for transmission.

In the present embodiment, the execution body may select the highest-ranked group cheating proportion of the account identifications in the sorting result as the group cheating account identification for transmission. Taking the group cheating proportion being 10% as an example, the execution body may select the top 10% of the account identifications in the sorting result as the cheating account identifications. Thereafter, the execution body may send the selected group cheating account identifications to the terminal device transmitting the group cheating prediction request.

As can be seen from FIG. 5, the flow 500 of the method for generating information in the present embodiment highlights the step of determining a group cheating account identification based on the group cheating prediction request and the importance degree information as compared to the corresponding embodiment of FIG. 2. Thus, the solution described in the present embodiment can determine the group cheating account identification according to the generated importance degree information, thereby realizing identification of the group cheating account identification.

Figure 6:
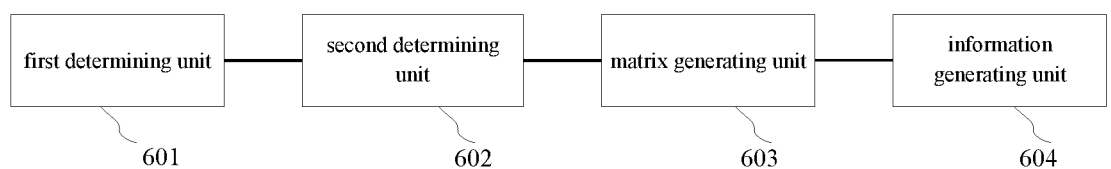
FIG. 6 is a schematic structural diagram of an embodiment of an apparatus for generating information according to the present disclosure.

With further reference to FIG. 6, as an implementation of the method shown in above figures, the present disclosure provides an embodiment of an apparatus for generating information, which corresponds to the method embodiment shown in FIG. 2, and the apparatus is applicable to various electronic devices.

As shown in FIG. 6, the apparatus 600 for generating information in the present embodiment includes a first determining unit 601, a second determining unit 602, a matrix generating unit 603, and an information generating unit 604. The first determining unit 601 is configured to determine identity-related information corresponding to at least one account identification based on historical upload information; the second determining unit 602 is configured to determine an account relationship matrix between the at least one account identification based on the identity-related information corresponding to the at least one account identification; the matrix generating unit 603 is configured to obtain a probability transfer matrix from the account relationship matrix; the information generation unit 604 is configured to calculate the importance degree information of the at least one account identification based on the probability transition matrix and the predetermined initial importance degree vector.

In the present embodiment, the specific processing of the first determining unit 601, the second determining unit 602, the matrix generating unit 603, and the information generating unit 604 of the apparatus 600 for generating information and the technical effects thereof may be described with reference to the related descriptions of step 201, step 202, step 203, and step 204 in the corresponding embodiment of FIG. 2, respectively, and details are not described herein.

In some alternative implementations of the present embodiment, the apparatus 600 further includes a receiving unit (not shown) configured to receive a group cheating prediction request, where the group cheating prediction request includes a group cheating proportion; a sorting unit (not shown) configured to sort the account identifications in the at least one account identification in a descending order of importance degrees according to the importance degree information; a transmitting unit (not shown in the figure) configured to select a highest-ranked group cheating portion of account identifications in the sorting result as the group cheating account identifications for transmission.

In some alternative implementations of the present embodiment, the information generating unit 604 is further configured to perform, using the initial importance degree vector as the previous importance degree vector, following information determining steps: multiplying the probability transition matrix by the previous importance degree vector; determining a current importance degree vector based on the multiplication result; determining whether a difference between the current importance degree vector and the previous importance degree vector is greater than a preset difference threshold; in response to determining that the difference between the current importance degree vector and the previous importance degree vector is not greater than a preset difference threshold, using the current importance degree vector as the importance degree information.

In some alternative implementations of the present embodiment, the information determining step further includes continuing to perform the information determining step by using the current importance degree vector as the previous importance degree vector in response to determining that the difference between the current importance degree vector and the previous importance degree vector is greater than the preset difference threshold.

In some alternative implementations of the present embodiment, the identity-related information corresponding to the account identification in the at least one account identification includes at least one identity feature; and the second determining unit 602 is further configured to set a weight for the identity feature in the at least one identity feature based on the predetermined relationship weight information; determining an account relationship matrix between the at least one account identification based on the weight of the identity feature in the at least one identity feature and the identity-related information corresponding to the at least one account identification.

Figure 7:
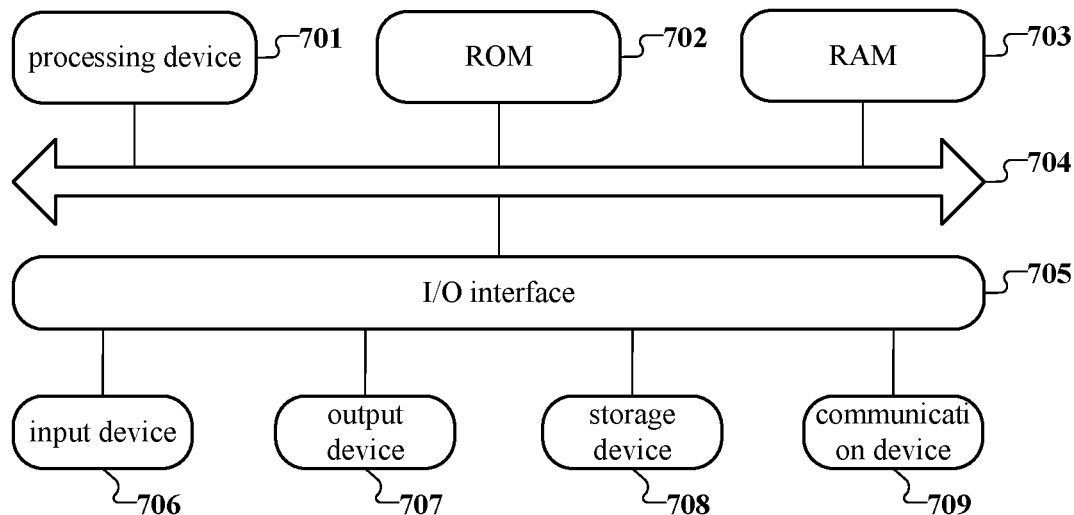
FIG. 7 is a schematic structural diagram of a computer system adapted for implementing a server of an embodiment of the present disclosure.

Referring to FIG. 7, a schematic structural diagram of an electronic device (e.g., a server in FIG. 1) 700 adapted to implement embodiments of the present disclosure is shown. The server shown in FIG. 7 is merely an example and should not be construed as limiting the functionality and scope of embodiments of the present disclosure.

As shown in FIG. 7, the electronic device 700 may include a processing device (e.g., a central processing unit, a graphics processor, or the like) 701, which may perform various appropriate actions and processes according to a program stored in a read-only memory (ROM) 702 or a program loaded from a storage device 708 into a random access memory (RAM) 703. In RAM 703, various programs and data required for operation of the electronic device 700 are also stored. The processing devices 701, ROM 702 and RAM 703 are connected to each other via a bus 704. An input/output (I/O) interface 705 is also connected to bus 704.

Generally, the following devices may be connected to the I/O interface 705: an input device 706 including, for example, a touch screen, a touch pad, a keyboard, a mouse, a camera, a microphone, an accelerometer, a gyroscope, and the like; an output device 707 including, for example, a liquid crystal display (LCD), a speaker, a vibrator, or the like; a storage device 708 including, for example, a magnetic tape, a hard disk, and the like; and a communication device 709. Communication device 709 may allow electronic device 700 to wirelessly or wirelessly communicate with other devices to exchange data. Although FIG. 7 illustrates an electronic device 700 having various devices, it should be understood that not all of the devices or implementations of the devices shown are required. More or fewer devices may alternatively be implemented or provided. Each block shown in FIG. 7 may represent one device or multiple devices as desired.

In particular, in accordance with embodiments of the present disclosure, the process described above with reference to the flowchart may be implemented as a computer software program. For example, embodiments of the present disclosure include a computer program product including a computer program embodied on a computer readable medium, the computer program including program code for performing the method shown in the flowchart. In such an embodiment, the computer program may be downloaded and installed from the network through the communication device 709, or installed from the storage device 708, or installed from the ROM 702. When the computer program is executed by the processing apparatus 701, the above functions defined in the method of embodiments of the present disclosure are performed.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In embodiments of the present disclosure, the computer readable storage medium may be any physical medium containing or storing programs which can be used by a command execution system, apparatus or element or incorporated thereto. In embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer readable medium may be included in the electronic device; or a stand-alone computer readable medium not assembled into the apparatus. The computer-readable medium carries one or more programs that, when executed by the electronic device, cause the electronic device to: determine identity-related information corresponding to at least one account identification based on historical upload information; determine an account relationship matrix between the at least one account identification based on the identity-related information corresponding to the at least one account identification; obtain a probability transfer matrix according to the account relationship matrix; calculating importance degree information of the at least one account identification based on the probability transition matrix and a predetermined initial importance degree vector.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in embodiments of the present disclosure may be implemented by means of software or hardware. The described units may also be provided in a processor, for example, described as: a processor, including a first determining unit, a second determining unit, a matrix generating unit, and an information generating unit. The names of these units do not constitute a limitation on the unit itself in some cases. For example, the first determining unit may also be described as a unit for determining the identity-related information corresponding to the at least one account identification according to the historical upload information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
   determining identity-related information corresponding to at least one account identification according to historical upload information;
   determining an account relationship matrix between the at least one account identification according to the identity-related information corresponding to the at least one account identification;
   obtaining a probability transition matrix according to the account relationship matrix; and
   calculating importance degree information of the at least one account identification based on the probability transition matrix and a preset initial importance degree vector, wherein the calculating importance degree information of the at least one account identification based on the probability transition matrix and a predetermined initial importance degree vector comprises:
      performing, using the initial importance degree vector as a previous importance degree vector, following information determining steps: multiplying the probability transition matrix by the previous importance degree vector; determining a current importance degree vector based on the multiplication result determining whether a difference between the current importance degree vector and the previous importance degree vector is greater than a preset difference threshold; and in response to determining that the difference between the current importance degree vector and the previous importance degree vector is not greater than the preset difference threshold, using the current importance degree vector as the importance degree information, wherein the information determining step further comprises:
      in response to determining that the difference between the current importance degree vector and the previous importance degree vector is greater than the preset difference threshold, continuing to perform the information determining step by using the current importance degree vector as the previous importance degree vector.

2. The method of claim 1, wherein the method further comprises:
   receiving a group cheating prediction request, wherein the group cheating prediction request comprises a group cheating proportion;
   sorting account identifications in the at least one account identification in a descending order of importance degrees according to the importance degree information; and
   selecting a highest-ranked group cheating proportion of the account identifications in a sorting result as the group cheating account identification for transmission.

3. The method of claim 1, wherein the identity-related information corresponding to the account identification in the at least one account identification comprises at least one identity feature; and
   the determining an account relationship matrix between the at least one account identification according to the identity-related information corresponding to the at least one account identification comprises:
      setting a weight for an identity feature in the at least one identity feature based on the predetermined relationship weight information, and
      determining the account relationship matrix between the at least one account identification based on the weight of the identity feature in the at least one identity feature and the identity-related information corresponding to the at least one account identification.

4. An apparatus for generating information, comprising:
   at least one processor; and
   a memory storing instructions, wherein the instructions, when executed by the at least one processor, cause the at least one processor to perform operations, the operations comprising:
      determining identity-related information corresponding to at least one account identification based on historical upload information;
      determining an account relationship matrix between the at least one account identification according to the identity-related information corresponding to the at least one account identification;
      obtaining a probability transition matrix according to the account relationship matrix; and
      calculating importance degree information of the at least one account identification based on the probability transition matrix and a predetermined initial importance degree vector, wherein the calculating importance degree information of the at least one account identification based on the probability transition matrix and a predetermined initial importance degree vector comprises:
         performing, using the initial importance degree vector as a previous importance degree vector, following information determining steps: multiplying the probability transition matrix by the previous importance degree vector; determining a current importance degree vector based on the multiplication result determining whether a difference between the current importance degree vector and the previous importance degree vector is greater than a preset difference threshold; and in response to determining that the difference between the current importance degree vector and the previous importance degree vector is not greater than the preset difference threshold, using the current importance degree vector as the importance degree information, wherein the
information determining step further comprises:
in response to determining that the difference
between the current importance degree vector and
the previous importance degree vector is greater
than the preset difference threshold, continuing to
perform the information determining step by using
the current importance degree vector as the previous importance degree vector.

5. The apparatus of claim 4, wherein the operations further comprise:
receiving a group cheating prediction request, wherein the group cheating prediction request includes a group cheating proportion;
sorting account identifications in the at least one account identification in a descending order of importance degrees according to the importance degree information; and
selecting a highest-ranked group cheating proportion of the account identifications in a sorting result as the group cheating account identification for transmission.

6. The apparatus of claim 4, wherein the identity-related information corresponding to the account identification in the at least one account identification comprises at least one identity feature; and
the determining an account relationship matrix between the at least one account identification according to the identity-related information corresponding to the at least one account identification comprises:
setting a weight for an identity feature in the at least one identity feature based on the predetermined relationship weight information, and
determining the account relationship matrix between the at least one account identification based on the weight of the identity feature in the at least one identity feature and the identity-related information corresponding to the at least one account identification.

7. A non-transitory computer readable medium storing a computer program, wherein the program, when executed by a processor, causes the processor to perform operations, the operations comprising:
determining identity-related information corresponding to at least one account identification according to historical upload information;
determining an account relationship matrix between the at least one account identification according to the identity-related information corresponding to the at least one account identification;
obtaining a probability transition matrix according to the account relationship matrix;
calculating importance degree information of the at least one account identification based on the probability transition matrix and a preset initial importance degree vector, wherein the calculating importance degree information of the at least one account identification based on the probability transition matrix and a predetermined initial importance degree vector comprises:
performing, using the initial importance degree vector as a previous importance degree vector, following information determining steps: multiplying the probability transition matrix by the previous importance degree vector; determining a current importance degree vector based on the multiplication result determining whether a difference between the current importance degree vector and the previous importance degree vector is greater than a preset difference threshold; and in response to determining that the difference between the current importance degree vector and the previous importance degree vector is not greater than the preset difference threshold, using the current importance degree vector as the importance degree information, wherein the information determining step further comprises:
in response to determining that the difference between the current importance degree vector and the previous importance degree vector is greater than the preset difference threshold, continuing to perform the information determining step by using the current importance degree vector as the previous importance degree vector.

* * * * *